United States Patent
Iacob et al.

(10) Patent No.: US 10,430,126 B2
(45) Date of Patent: Oct. 1, 2019

(54) METHOD FOR PRINTING MULTI-LAYER PRINT JOBS

(71) Applicant: Océ Holding B.V., Venlo (NL)

(72) Inventors: Violeta Iacob, Timisoara (RO); Radu Vulpe, Timisoara (RO); Daniel Chelaru, Timisoara (RO)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 15/888,467

(22) Filed: Feb. 5, 2018

(65) Prior Publication Data

US 2018/0232184 A1    Aug. 16, 2018

(30) Foreign Application Priority Data

Feb. 13, 2017    (EP) .................................... 17155895

(51) Int. Cl.
 *B41J 11/00*    (2006.01)
 *B41J 3/28*    (2006.01)
 *G06F 3/12*    (2006.01)

(52) U.S. Cl.
 CPC ............... *G06F 3/1211* (2013.01); *B41J 3/28* (2013.01); *B41J 11/002* (2013.01); *G06F 3/1204* (2013.01); *G06F 3/1241* (2013.01); *G06F 3/1257* (2013.01); *G06F 3/1262* (2013.01); *G06F 3/1263* (2013.01); *G06F 3/1282* (2013.01); *G06F 2206/1514* (2013.01)

(58) Field of Classification Search
 CPC ........ B41J 11/002; B41J 3/28; B41J 11/0015; B41J 2/2114; G06F 3/1211; G06F 3/1241; G06F 3/1257; G06F 3/1262; G06F 3/1263; B41M 7/0027
 See application file for complete search history.

(56) References Cited

U.S. PATENT DOCUMENTS

2012/0176645 A1* 7/2012 Saito ..................... G06F 3/1204
                                                                358/1.15

FOREIGN PATENT DOCUMENTS

WO    WO 2016/120139 A1    8/2016

OTHER PUBLICATIONS

European Search Report issued in EP 17 15 5895, dated Aug. 9, 2017.

* cited by examiner

*Primary Examiner* — Jason S Uhlenhake
(74) *Attorney, Agent, or Firm* — Birch, Stewart, Kolasch & Birch, LLP

(57) ABSTRACT

In a method for printing a plurality of print jobs on a flat bed printer, each print job specifies an image receiving area with a given shape and given dimensions where an image is to be printed on a recording medium. Each of the print jobs includes a number of sub-jobs specifying image layers to be printed in a predetermined print order, with print settings being individually assigned to each sub-job. The method includes grouping the sub-jobs by their print settings; nesting the image receiving areas of the print jobs on a flat bed of the printer; and printing the sub jobs group by group, with sub-jobs of the same group and from different print jobs being printed in common steps of scanning the flat bed. The scanning steps are performed in a scan order which preserves the print order in each print job.

7 Claims, 5 Drawing Sheets

METHOD FOR PRINTING MULTI-LAYER PRINT JOBS

TECHNICAL FIELD OF THE INVENTION

The present invention relates to a method for printing a plurality of print jobs on a flat bed printer, wherein each print job specifies an image receiving area with a given shape and given dimensions where an image is to be printed on a recording medium, and wherein each of the print jobs comprises a number of sub-jobs specifying image layers to be printed in a predetermined print order, with print settings being individually assigned to each sub-job.

BACKGROUND OF THE INVENTION

WO 2016/120139 A1 discloses a method of this type wherein a plurality of print jobs are grouped into a plurality of consecutive container jobs such that the print jobs which belong to the same container job have identical or similar job characteristics, permitting to execute these print jobs in a common scanning step in order to process the print jobs more efficiently.

If the print jobs comprise multi-layer print jobs requiring that the images to be printed comprise several layers printed one on top of the other, then the jobs can only be grouped into a common container job if the job characteristics are the same for the entire multi-layer jobs, so that the layers which correspond to one another in the print order can respectively be printed in common scanning steps.

It is an object of The present invention to provide a method for printing multi-layer print jobs with improved efficiency.

SUMMARY OF THE INVENTION

In order to achieve this object, the method according to The present invention comprises the steps of:
a) grouping the sub-jobs by their print settings;
b) nesting the image receiving areas of the print jobs on a flat bed of the printer; and
c) printing the sub-jobs group by group, with sub-jobs of the same group and from different print jobs being printed in common steps of scanning the flat bed, the scanning steps being performed in a scan order which preserves the print order in each print job.

The present invention permits to improve the efficiency in cases where two print jobs include sub-jobs with identical print settings, but the print orders are such that the sub-jobs relate to different layers of the multi-layer print jobs. In such cases, the method described above assures that the layer structure of at least one of the print jobs is shifted such that several of the sub-jobs which have identical or at least compatible print settings are printed in the same scanning step. Nevertheless, the requirement that the different layers of the image are printed in the required print order is fulfilled for each of the print jobs.

More specific optional features of The present invention are indicated in the dependent claims.

Examples of the print settings which apply to the various sub-jobs comprise the selection of print modes (single-pass or multi-pass, different numbers layers per pass), the selection of the print direction (forward or reward or bidirectional), and, in case of ink jet printing with UV-curing ink, for example, the required intensity of the UV lamps for curing.

In general, the print settings may comprise a set of different setting parameters. In that case, in order for two print settings to be "compatible", it is not always required that all setting parameters are equal. For example, it may be sufficient that the parameters specifying the intensity of the UV lamp is the same for both sub-jobs, whereas other parameter specifying the print resolution or the color mode, for example, may be different for the two sub-jobs.

In a more refined embodiment, there may also be a hierarchy of setting parameters in the sense that changing one parameter may be more time-consuming than changing another parameter. For example, it may take some time during a scan process to change the intensity of the UV-curing lamps, but it may take considerably more time to adjust the height of the print heads above the print substrate in order to adapt to different media thicknesses. In that case, in the process of grouping the sub-jobs, the parameter "print head height" will be given a higher priority than the parameter "curing intensity", so that the sub-jobs to be performed in the same scanning operation will consist of sub-jobs which require the same height of the print head, whereas avoiding differences in the curing intensity will have a lower priority.

In one embodiment, The present invention may be applied to a limited number of print jobs which have been selected such that the image receiving areas of the total of the print jobs will fit within the contour of the flat bed of the printer. It is possible however, to apply the method according to The present invention at first to a larger selection of print jobs, even though not all the image receiving areas specified in these print jobs will fit within the contour of the flat be at a time. Then, the decision which of these print jobs shall actually be executed together may be postponed until the required total number of scans is known. The print jobs may then be selected in view of minimizing the required number of scans.

BRIEF DESCRIPTION OF THE DRAWINGS

Embodiment examples will now be described in conjunction with the drawings, wherein.

DETAILED DESCRIPTION OF THE EMBODIMENTS

Figure 1:
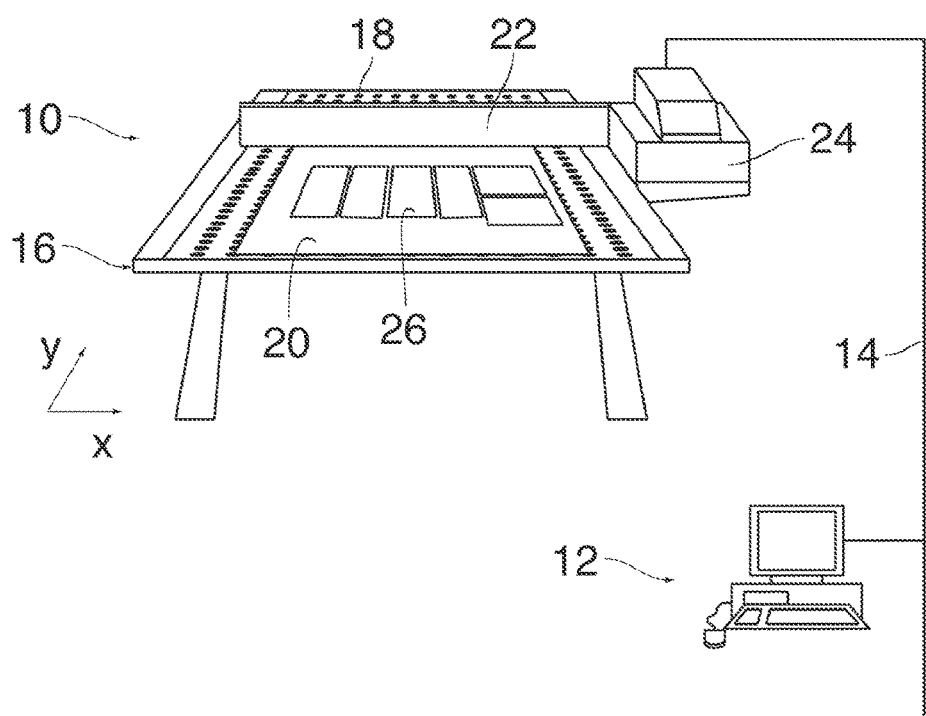
FIG. 1 is a schematic view of a printing system to which The present invention is applicable.

FIG. 1 shows a printing system comprising a flat bed printer 10 and a workstation 12 connected to the printer via a network 14 and permitting to compile and edit print jobs to be executed with the printer 10.

The printer 10 has a flat bed 16 with a rectangular flat bed surface in which a regular pattern of suction holes 18 has been formed. The suction holes are connected to a vacuum source, so that a print substrate 20, e.g. a rectangular sheet of paper, can be sucked against the flat bed surface so as to be immobilized on the flat bed.

A gantry 22 extends across the flat bed 16 in a main scanning direction x and is itself movable relative to the flatbed in a sub-scanning direction y. A print head 24, e.g. an ink jet print head, is driven for reciprocating movement along the gantry 22 in the main scanning direction and is controlled to eject a marking material (ink) onto the print substrate 20 so as to form a swath of a printed image in each scan pass.

The movements of the gantry 22 and of the print head 24 and the ejection of ink by the print head are controlled by a print controller which may be implemented in the printer 10 or in the workstation 12.

In the example shown in FIG. 1, six print jobs have been compiled for being processed simultaneously on the printer 10. Each print job specifies an image receiving area 26 with a given shape and given dimensions, where the image is to be printed. The image receiving areas 26 are nested on the flat bed 16 such that all image receiving areas fit within the contour of the flat bed. In the example shown, the image receiving areas 26 fit within the contour of the print substrate 20 which is a single sheet of a recording medium and will later be cut into separate sheets such that each sheet includes one of the image receiving areas 26.

In a modified embodiment, the print substrate may comprise pre-cut sheets which are manually positioned on the flat bed 16 in positions as specified by a nesting algorithm implemented in the print controller.

In the given example, it is assumed that the scanning speed of the print head 24 is higher in the main scanning direction x than in the sub-scanning direction y. It is therefore preferred to nest the image receiving areas 26 in the main scanning direction x, although it is possible to nest at least some of the image receiving areas also in the sub-scanning direction, as in the shown example, in order to more fully utilize the available space on the flat bed.

It shall be assumed here that at least some of the print jobs that have been compiled for being printed in a common printing operation on the printer 10 are multi-layer print jobs requiring ink to be deposited on the recording medium in two or more layers. For example, a multi-layer print job may comprise printing a white background layer as the first layer on the print substrate, than a color image layer on the background layer, and finally a transparent varnish layer on top of the image layer.

Figure 2:
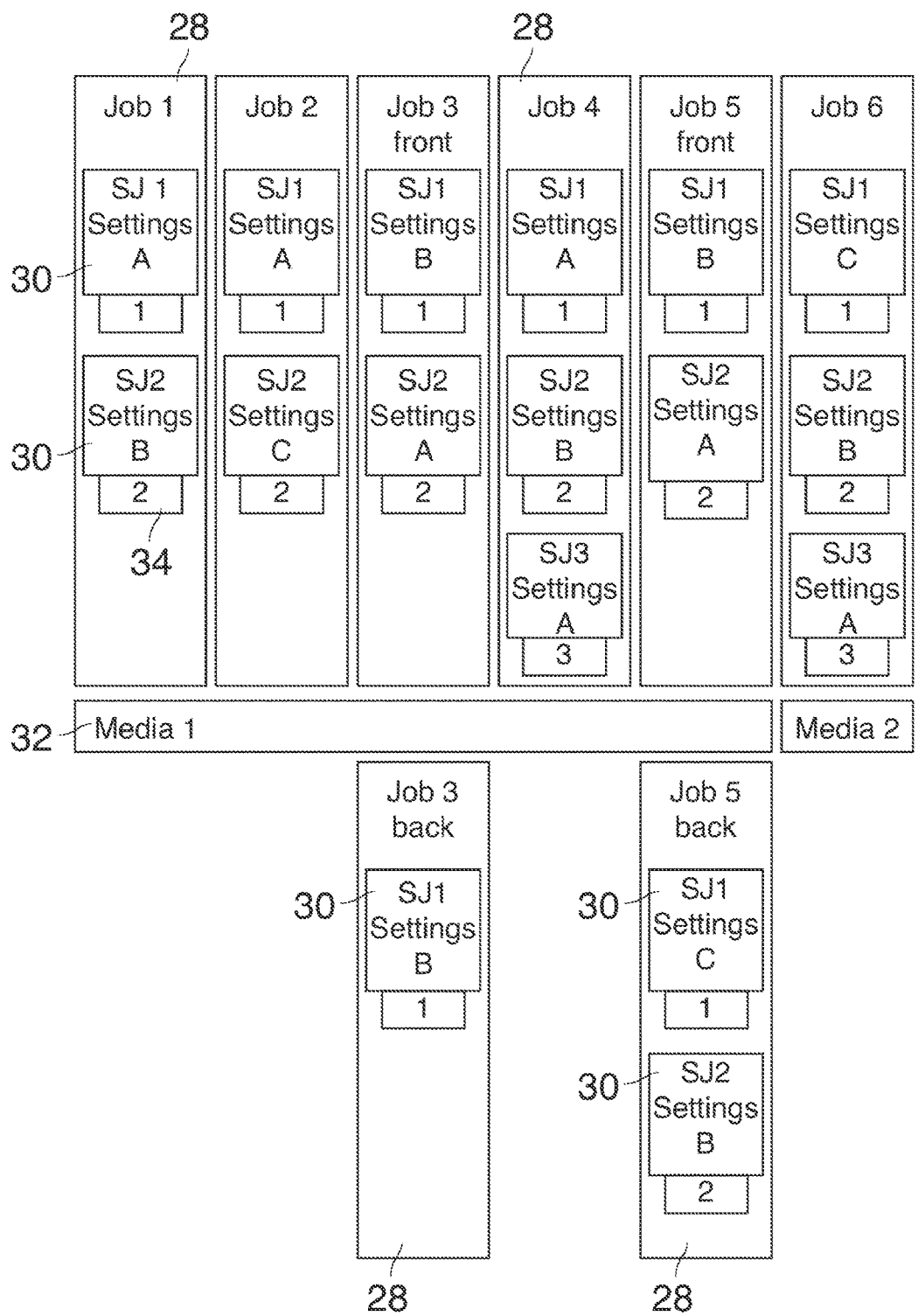
FIG. 2 is a diagram illustrating a layer structure of a plurality of print jobs to be printed in accordance with the method according to The present invention.

As an example, FIG. 2 shows a layer structure of six print jobs 28 (designated as "Job 1", . . . "Job 6"). Each print job comprises a plurality of sub-jobs 30. Each sub-job includes print data and print settings for one of the layers of the image to be printed. The sub-job specifying the first layer to be printed directly on the print substrate is designated as "SJ1", the sub-job for the second layer is designated as "SJ2", and so on.

In the simplified example shown here, the print settings for the sub-jobs 30 of all six print jobs 28 comprise only three different sets of print settings, designated as "Settings A", "Settings B" and "Settings C".

The print settings further include another setting parameter 32 relating to the type of media ("Media 1" or "Media 2") to be used as the print substrate. This setting parameter 32 has been shown separately in FIG. 2 because, obviously, this parameter has to be the same for all layers of the image and consequently for all sub-jobs of the print job.

In the example shown, "Media 1" has been specified for the Jobs 1 to 5, whereas a different media type "Media 2" has been specified for Job 6. Of course, this is possible only when the print substrate takes the form of pre-cut sheets which are nested on the flat bed 16. If the print substrate 20 takes the form of a single sheet, as shown in FIG. 1, the media type must be the same for all jobs. In that case, Job 6 would be removed from consideration because it could not be printed together with the other jobs, anyway.

In the example shown in FIG. 2, Job 1, Job 2 and Job 4 are simplex jobs where an image is printed only on one side of the media, whereas Job 3 and Job 5 are duplex jobs requiring that an image is also printed on the back side of the media sheet. Since the images on the front side and on the back side of a media sheet can not be printed in one and the same scanning step, it is convenient to treat the set of sub-jobs 30 applying to the front side and the set of sub-jobs 30 applying to the back side as separate print jobs.

Thus, disregarding Job 6 and disregarding also the back side jobs, there remain five print jobs 28 to be processed in a common scanning operation in which the print head 24 will scan the entire surface covered by the image receiving areas 26 one or more times in order to print the multiple layers of each image.

Would the print settings be the same for all sub-jobs 30 of all five print jobs, a high printing efficiency would be possible because the print head 24 could move back and forth across the flat bed 16 in consecutive scan passes so as to print, for example, the first layers of all five images simultaneously, then simultaneously print the second layers of all five images and finally the third layer for Job 4. However, as has been assumed in this example, the print settings are different from one another, so that changes in the settings have to be made whenever the print head moves from an image receiving area 26 to another one where another settings apply for the image layer that is to be printed. Since the change of the settings requires a certain time, it is desirable in terms of printing efficiency that the layers are rearranged such that the print head 24 can perform complete scan passes without having to pause for changing the settings.

To that end, the sub-jobs 30 of all print jobs 28 in consideration (Job 1 to Job 5) are grouped such that each group contains only one sub-job from each print job and the same print settings apply to all sub-jobs in the group. Thus, a first group to which the Settings A apply comprises the sub-jobs SJ1, respectively, of the Job 1, Job 2 and Job 4, and the sub-jobs SJ2, respectively, of Job 3 and Job 5. It is noted that the Settings A apply also to the sub-job SJ3 of Job 4. However, this sub-job SJ3 does not form part of the group because the group contains already the sub-job SJ1 from the same print job.

Similarly, a group to which the Settings B apply comprises the sub-jobs SJ1, respectively, of Job 3 and Job 5 and the sub-jobs SJ2, respectively, of Job 1 and Job 4. The sub-job SJ2 of Job 2, to which the Settings C apply, forms a third group.

In FIG. 2, each of the sub-jobs 30 has been labeled by a scan number 34 which may have the value "1", "2" or "3". These scan numbers have been selected such that they preserve the print order in which the layers defined by the various sub-jobs are to be printed. A straightforward way to do this is to assign the scan number "1" to all sub-jobs SJ1, the scan number "2" to all sub-jobs SJ2, and the scan number "3" to all sub-jobs SJ3.

Figure 3:
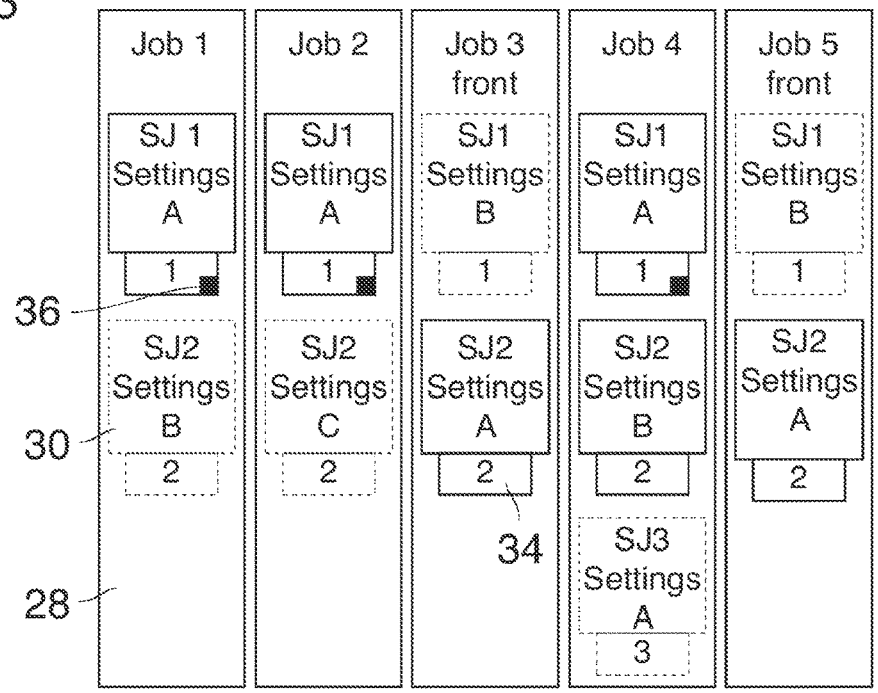
FIGS. 3 to 8 are diagrams analogous to FIG. 2, illustrating steps of the method according to The present invention.

FIG. 3 illustrates a step in which the first group to which the Settings A apply has been selected for further consideration. The sub-jobs that belong to that group have been shown in continuous lines, whereas the other sub-jobs have only been shown in dashed lines. It is observed that three of the sub-jobs in consideration have the scan number "1", whereas the forth one, SJ2 of Job 3, and the fifth one, SJ2 in Job 5, have the scan number "2". Thus, the image layers to be printed in these sub-jobs would not be printed in a common scanning step. Instead, a separate scanning step would be required for printing the sub-jobs SJ2 of Job 3 and Job 5.

For more efficiency, it would desirable to reduce the scan number of the sub-job SJ2 of Job 3 from "2" to "1", so that all four sub-jobs could be processed in one and the same step. However, this would violate the print order in Job 3 which requires that the first layer shall contain the image data specified in SJ1 and not the data specified in SJ2. The same holds true for sub-job SJ2 of Job 5. Consequently, it is not possible in this case to assign the same scan number "1" to all five sub-jobs in the group. The scan number "1" occurs three times in this group whereas the scan number "2" occurs only twice. In other words, the frequency with which the scan number "1" occurs in the group is three, which is the highest frequency for this group. This is why the sub-jobs with Settings A and scan number "1" have been marked by a mark 36 in FIG. 3.

Figure 4:
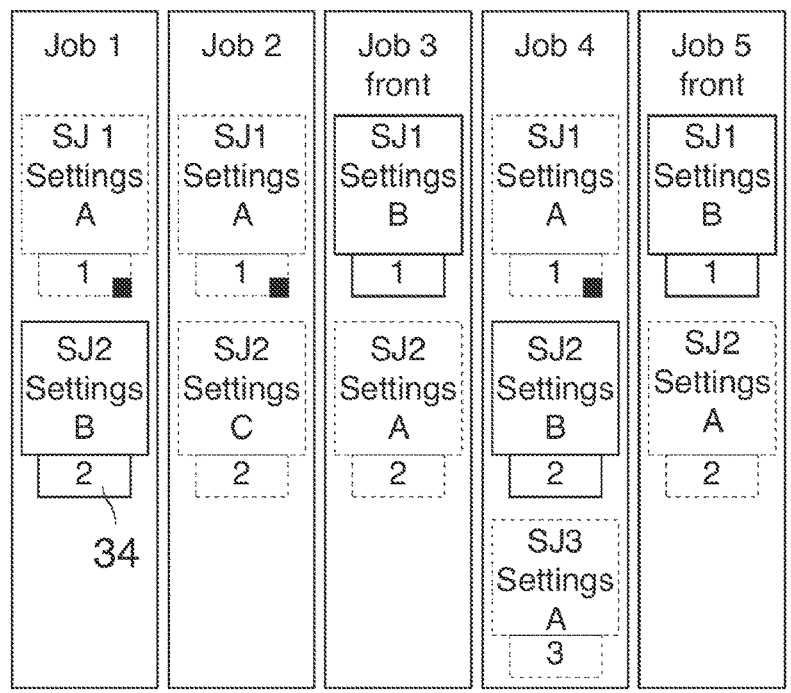

FIG. 4 illustrates a subsequent step in which the group of sub-jobs with the Settings B is taken into a consideration. Two members of this group, SJ1 in Job 3 and SJ1 in Job 5 have scan number "1", and another two, SJ2 in Job 1 and SJ2 in Job 4 have scan number "2". In order to maximize the number of group members with equal scan numbers, one could either change all scan numbers to "1" or change all scan numbers to "2". The first option would violate the requirement to preserve the print order because, in Job2 for example, the sub-job SJ1 has to be printed earlier than the sub-job SJ2. Thus, the only option that is left is to change all scan numbers to "2", as has been shown in FIG. 5. For clarity, all sub-jobs which have the same scan number have been placed in the same line. In this case, the mark 36 can be applied to all four members of the group with Settings B.

Figure 5:
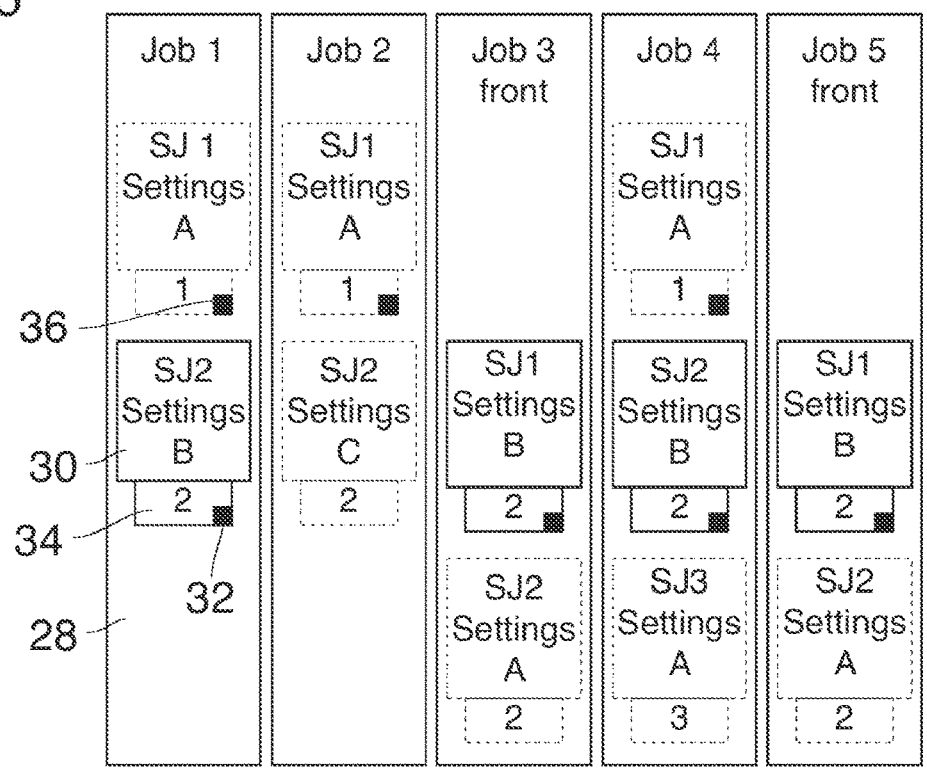

Considering Job 3, it can be seen in FIG. 5 that the change of the scan number "2" for sub-job SJ1 seems to violate the print order criterion for sub-job SJ2 which, so far, also has the scan number "2". This problem will be dealt with in a subsequent step where the remaining sub-jobs with settings A are considered.

Figure 6:
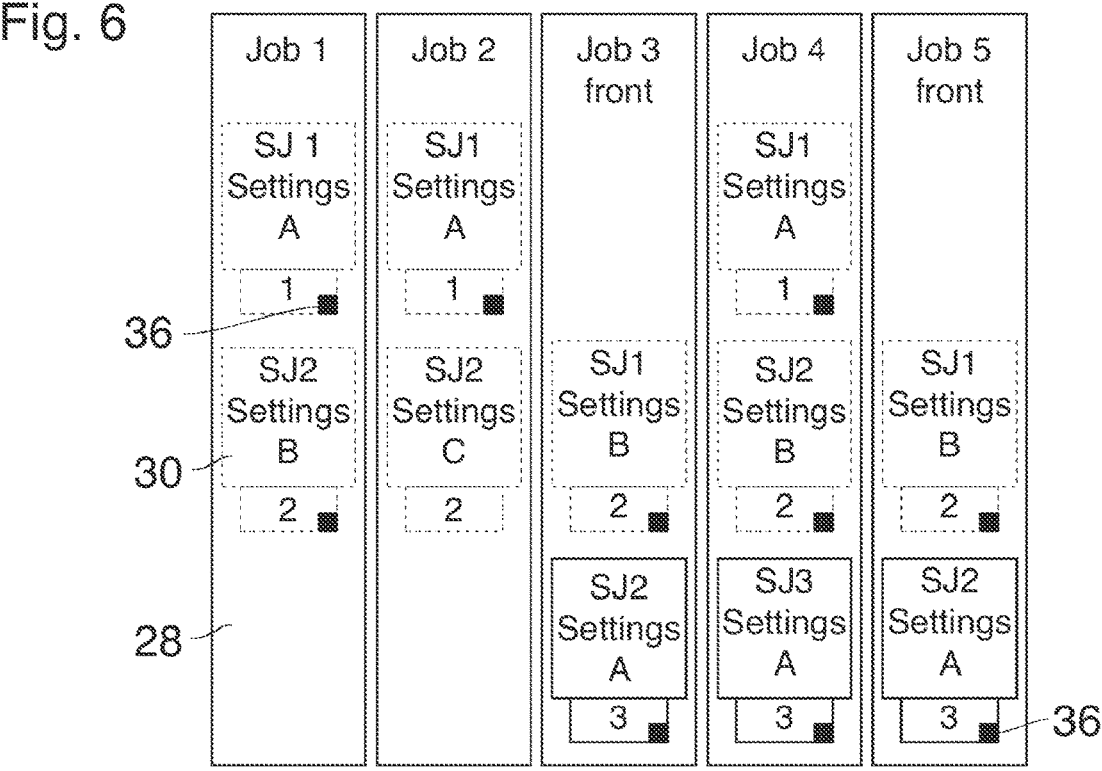

This step is illustrated in FIG. 6, where the scan numbers of the sub-jobs SJ2, respectively, in Jobs 3 and 5 have been increased to "3" so as to re-establish the print order criterion for these jobs. As it happens, the sub-job SJ3 in Job 4 has also the scan number "3" so that all scan numbers in the group are equal and the mark 36 can be applied to all group members.

Figure 7:
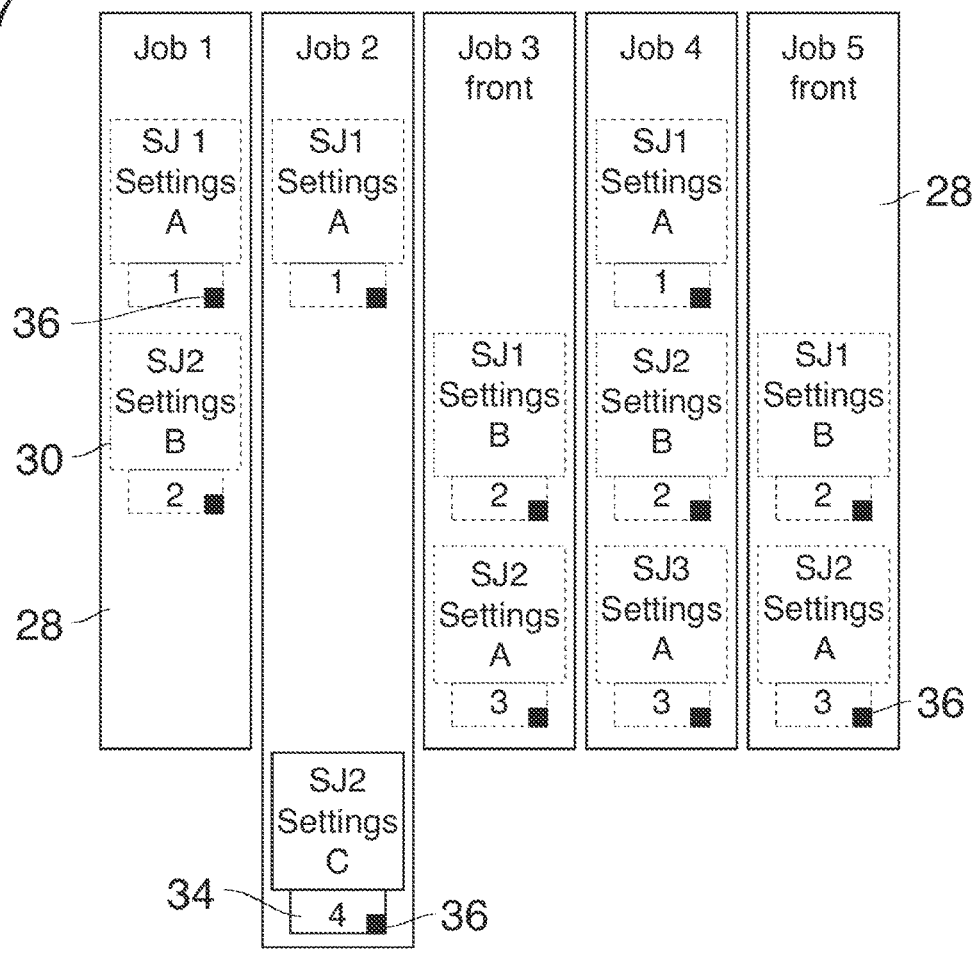

Then, the only sub-job that remains is sub-job SJ2 of Job 2. Since this sub-job is the only one with Settings C, it must be executed in a separate scanning step. Since the scan numbers "1" to "3" have been assigned already, the sub-job with the Settings C gets the scan number "4" as has been shown in FIG. 7. Now, all sub-jobs have received the mark 36 and the scan numbers establish a scan order which assures that as many sub-jobs as possible can be executed in a common scanning step, so that the printing efficiency is optimized.

Figure 8:
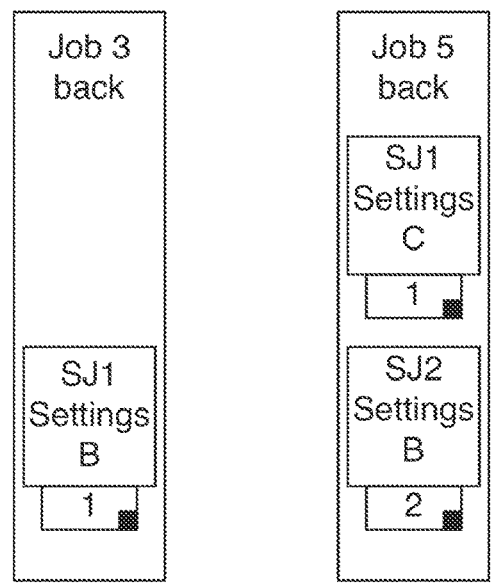

FIG. 8 shows a result of a corresponding optimization procedure for the jobs to be performed on the back side of the substrate. It can be seen that, compared to FIG. 2, the scan number of sub-job SJ1 in Job 3 has been increased to "2", so that this sub-job can be executed in the same scanning step as sub-job SJ2 of Job 5.

Once a scan order for a selection of jobs has been established in the manner described above, the image receiving areas 26 for these jobs are nested on the flat bed 16 as shown in FIG. 1.

In the example shown, the image receiving areas 26 of all six print jobs fit within the contour of the flat bed 16, so that, depending upon the print settings, it might be possible to process all print jobs in common scanning steps, one scanning step being defined as a step in which the print head 24 performs scan passes in the main scanning direction x while the gantry 22 moves in the sub-scanning direction y until the print head has been moved over the entire area that is covered by the image receiving areas 26.

If the print head 24 is an ink jet print head printing with radiation-curable ink, it may be required that all print jobs that are processed together on the flat bed 16 have the same number of image layers, in order to assure that the accumulated energy of the curing radiation is the same for all printed images.

On the other hand, it is not prerequisite that the number of print jobs for which the optimization procedure is performed in the manner shown in FIGS. 2 to 8 is so small that the image receiving areas of all these print jobs fit within the flat bed 16. For example, the flat bed might be so small that only the image receiving areas of four of the five print jobs shown in FIG. 7 would fit in the flat bed. In that case, it can clearly be seen that it would be most efficient to leave out Job 2 because this would reduce the total number of scanning steps to be performed from four to three. The remaining Job 2 may then be scheduled for processing together with other jobs which might possibly include sub-jobs to which the Settings C apply as well.

The invention claimed is:

1. A method for printing a plurality of print jobs on a flat bed printer, wherein each print job specifies an image receiving area with a given shape and given dimensions where an image is to be printed on a recording medium, and wherein each of the print jobs comprises a number of sub-jobs specifying image layers to be printed on top of each other in a predetermined print order, with print settings being individually assigned to each sub-job, said method comprising the steps of:
   a) grouping the sub-jobs by their print settings;
   b) nesting the image receiving areas of the print jobs on a flat bed of the printer; and
   c) printing the sub-jobs group by group, with sub-jobs of the same group and from different print jobs being printed in common steps of scanning the flat bed, the scanning steps being performed in a scan order which preserves the print order in each print job,
   wherein the step a) includes sub-steps of:
      a1) grouping the sub-jobs into groups of sub-jobs which belong to different print jobs and have print settings which are compatible with one another, since the print settings permit the sub-jobs to be executed in a common step of scanning the flat bed;
      a2) labeling the sub-jobs preliminarily with scan numbers which preserve the print order, since the scan number of a sub-job is larger than the scan number of the sub-job that belongs to the same print job and precedes in the print order;
      a3) selecting a group from among the groups formed in the preceding grouping step;
      a4) varying the scan numbers of the sub-jobs in the group so as to maximize the number of sub-jobs with identical scan numbers, while preserving the print order;
      a5) marking the sub-jobs whose scan number occurs with the highest frequency in the group;

a6) grouping the sub-jobs, which have not yet been marked, into groups of sub-jobs which belong to different print jobs and have compatible jobs settings; and a7) repeating the steps a3) to a6) until all sub-jobs have been marked, and wherein step c) comprises printing the sub jobs in the order of their scan numbers.

2. The method according to claim 1, wherein the print settings comprise settings that specify a print mode.

3. The method according to claim 1, wherein the print settings comprise a setting that specifies a print direction.

4. The method according to claim 1, wherein the printer is an ink jet printer operating with radiation-curable ink, and the print settings comprise a setting that specifies an intensity of curing radiation.

5. A flat bed printer, comprising a print controller configured to automatically perform the method according to claim 1.

6. A non-transitory computer-readable medium, comprising program code which, when executed on a print controller, causes the print controller to perform the method according to claim 1.

7. A non-transitory computer-readable medium, comprising program code which, when executed on a computer, causes the computer to perform the method according to claim 1.

* * * * *